United States Patent [19]
Okada et al.

[11] Patent Number: 5,892,743
[45] Date of Patent: Apr. 6, 1999

[54] INFORMATION REPRODUCING METHOD AND APPARATUS WITH SERVO CHARACTERISTIC CHANGE FOR SOUND REPRODUCTION

[75] Inventors: Kouji Okada, Kurume; Tsutomu Egashira, Saga-ken; Akihiro Nishiyama; Syuji Narahara, both of Kurume; Fuminobu Furukawa, Onojo, all of Japan

[73] Assignee: Matsushita Electric Industrial Co., Ltd., Osaka, Japan

[21] Appl. No.: 827,376

[22] Filed: Mar. 27, 1997

[30] Foreign Application Priority Data

Apr. 2, 1996 [JP] Japan .................................. 8-079791
Nov. 6, 1996 [JP] Japan .................................. 8-293501

[51] Int. Cl.$^6$ ................................ G11B 7/00; G11B 3/90
[52] U.S. Cl. .................................... 369/44.36; 369/44.35; 369/54
[58] Field of Search ............................ 369/44.27, 44.29, 369/44.35, 44.36, 47, 50, 54, 58, 44.32, 44.33

[56] References Cited

U.S. PATENT DOCUMENTS

| | | | |
|---|---|---|---|
| 5,289,451 | 2/1994 | Ashinuma et al. | 369/44.29 X |
| 5,315,570 | 5/1994 | Miura et al. | 369/54 X |
| 5,463,602 | 10/1995 | Oka et al. | 369/44.29 |
| 5,541,900 | 7/1996 | Ito et al. | 369/44.29 X |

FOREIGN PATENT DOCUMENTS 39557 12/1984 Japan .

*Primary Examiner*—Paul W. Huber
*Attorney, Agent, or Firm*—Stevens, Davis, Miller & Mosher, L.L.P.

[57] ABSTRACT

An object of the present invention is to provide an optical disk reproducing method and apparatus which allows for influence on focus servo control and tracking servo control involved in outputting voice information. The optical disk reproducing apparatus includes an optical pickup, a tracking servo control for causing the optical pickup to trace a track on the optical disk, a focus servo control and a pair of speakers for outputting reproduced voice information to the outside. When an information determining unit determines that the reproduced information includes voice information, the tracking servo control and the focus servo control are operated so as to provide a servo characteristic suitable for reproduction of voice information by the speakers to thereby reproduce information in the optical disk.

12 Claims, 14 Drawing Sheets

INFORMATION REPRODUCING METHOD AND APPARATUS WITH SERVO CHARACTERISTIC CHANGE FOR SOUND REPRODUCTION

BACKGROUND OF THE INVENTION

1. Field of the Invention

The-present invention relates to optical disk reproducing methods and apparatus for reproducing an optical disk such as a CD-ROM which has stored a large amount of voice, character, image information and which has been connected to a personal computer, especially a lap-top computer.

2. Description of the Related Art

Recently, audio CDs as well as optical disks such as CD-ROMs have spread and efforts have been put into the development of optical disks of high performance in the related fields. Especially, since the optical disk is capable of recording/reproducing a large amount of data at high speed, a CD-ROM player as a data reproducing device has recently spread rapidly as the central existence of multimedia.

A conventional optical disk reproducing apparatus will be described next using a CD-ROM player as an example. FIG. 10 is a block diagram of the conventional CD-ROM player. Reference numeral 1 denotes a CD-ROM as an optical disk; 2, a spindle motor which rotates the CD-ROM 1; and 3, an optical pickup as optical reproducing means which reads information recorded on the CD-ROM 1.

The optical pickup 3 is comprised of a mechanical section and an optical section. The mechanical section is comprised of an object lens 4 which focuses light onto a recording surface of the CD-ROM 1, and an object lens actuator 5 integral with the object lens 4 to move the object lens 4 in a direction normal to a surface of the CD-ROM 1 (hereinafter referred to as "focusing direction") and in a radial direction of the CD-ROM 1 (hereinafter referred to as "tracking direction"). The optical section is comprised of a semiconductor laser, various prisms and an optical sensor 6.

A signal from the optical sensor 6 is delivered to a focus servo control unit 8, a tracking servo control unit 9, and an information signal detector 11 which produce a focus error signal, a tracking error signal and an information detection signal to provide focus control and tracking control of the object lens 4 and signal processing by a signal processor 12, respectively.

A reference numeral 7 denotes a linear motor which is controlled by an access control unit 10 when the optical pickup 3 moves greatly across tracks to thereby move the optical pickup 3 to a target track.

Reference numeral 13 denotes an interface control unit which outputs an information detection signal obtained as the result of information processing by a controller 15 through the interface control unit 13 and a PCMCIA card 22 to a host device (such as a computer) (not shown). Of the signals detected by the information signal detector 11, voice information is produced as a voice signal by the signal processor 12, and outputted by the controller 15 through the interface control unit 13 to the host device (computer). Alternatively, it is delivered through headphone terminals 23 to an external voice output device which then produces a corresponding voice output.

The information detection signal is delivered to the spindle motor control unit 14 to rotate the spindle motor 2 at constant rotational speeds. The controller 15 controls the whole operation of the CD-ROM player.

FIG. 11 is a perspective view of a CD-ROM player 21 as a conventional optical disk reproducing apparatus of an external connection type (hereinafter referred to as a portable type) through the interface (PCMCAia) card 22 to a lap-top personal computer (not shown). Reference numeral 23 denotes headphone terminals to output reproduced voice information from the CD-ROM 1 to the outside. By connecting a headphone (not shown) to the headphone terminals 23, voice is reproducible.

Servo control of the conventional CD-ROM player, thus constructed, will be described next. The CD-ROM has an information track provided in a spiral form in which an information signal is recorded. Since the track interval is very small (1.6 μm), a light spot is required to be positioned with high accuracy relative to the rotating CD-ROM 1 to detect an information signal accurately from the track.

A detailed schematic of the conventional focus servo control unit 8 is shown in FIG. 12, in which reference numeral 15 denotes the controller of FIG. 10; 16, a phase compensation filter to stabilize the servo system; 17, a servo amplifier; 18, a servo gain setting circuit; and 19, a driver.

The operation of the conventional focus servo control unit 8, thus constructed, will be described next. A focus error signal obtained from the optical pickup 3 is inputted to the phase compensation filter 16 to stabilize the servo system. It is then amplified by the servo amplifier 17 and delivered through the driver 19 to the object lens actuator 5 for driving purposes.

The servo gain setting circuit 18 is provided to maintain the servo gain at a fixed value in spite of variations in the optical signal from the optical pickup 3 and the sensitivity of the object lens actuator 5. The amplification factor of the servo amplifier 17 is set by the controller 15 so that a desired drive output is obtained from the driver 19.

Tracking servo control will be described next. FIG. 13 shows an open loop characteristic of the tracking servo. For example, the standard value of the maximum eccentric quantity of the CD-ROM 1 is ±70 μm whereas the actual mechanical eccentric value is about ±120 μm when the eccentricity of the motor shaft and a turn table are considered.

In order to avoid a reduction of an error rate of the reproduced signal, a deviation of a track (optical pit) is required to be suppressed to within ±0.1 μm.

Thus, a servo gain in a low frequency (less than 30 Hz) region is set at $$20 \log (120/0.1) = 61.6 \text{ dB}.$$

While the maximum eccentric acceleration is 0.4 G according to the above-mentioned standards in a high-frequency region servo gain, the gain intersection is set at about 1 kHz to improve resistance to vibrations of the optical disk reproducing apparatus and to suppress a high-harmonic resonance frequency.

As described above with reference to the standard values of an optical disk such as a CD-ROM, its roundness and flatness involve errors, which cooperate with an error involved in the optical disk reproducing apparatus itself to rotate the optical disk while vibrating same a little in a radial direction (hereinafter referred to as "eccentricity") or rotating same while vibrating same vertically (hereinafter referred to as "plane vibrations"). A quantity of plane vibrations/eccentricity varies from optical disk to optical disk. Some commercially available optical disks exceed the standards of plane vibrations and eccentricity.

When information to be reproduced is voice information in the conventional portable optical disk reproducing apparatus, the voice output is delivered to the host or to external speaker means through the headphone terminal of the apparatus.

In order to regard the portability of the portable optical disk reproducing apparatus as important, an optical disk reproducing apparatus in which the voice information outputting speaker means is built in the optical disk reproducing device has been developed. The influence of the optical reproducing means on the servo control varies between when the portable type optical disk reproducing apparatus is usually used to reproduce character/image information (inclusive of outputting voice information through the headphone terminals, which applies hereinafter to a similar case) and when the voice information is output by the built-in speaker means.

When the voice information is outputted through the built-in speaker means, the speaker means is provided adjacent the optical reproducing means (optical pickup) due to the problem of the size and spacial arrangement of the reproducing apparatus itself, and, hence, the influence on the voice output due to vibrations of the speaker means occurs. Thus, when the set value of the servo gain is designed in conformity to the standards, the reproducing apparatus operates at the fixed set value in spite of influence due to vibrations of the built-in speaker means. Thus, when information in the optical disk is reproduced, the focus and tracking errors will exceed the predetermined allowable values to thereby bring about no normal reproduction.

For example, FIG. 14 shows a state where the focus error has exceeded an allowable range. As shown, when the optical disk information is reproduced when the quantity of plane vibrations exceeds the standard, the focus error signal will not fall within the allowable range. Thus, in order to reproduce. information in the optical disk normally in such a case, the focus servo gain is required to be increased or otherwise the characteristic of the servo loop gain (or phase compensation filter) is required to be changed.

In order to increase the servo gain, the amplification factor of the servo amplifier could be increased. However, in this method, the focus error signal is suppressed by increasing the servo gain. Since the gains in both the servo and higher frequency regions increase simultaneously, the reproduced output reacts sensitively to flaws on, and/or noise in, the optical disk, and the playability of reproduced information over the flaws on the optical disk in the normal disk reproduction (involving no voice output by the built-in speaker means) would be deteriorated. In addition, excessive control is provided on an optical disk whose quantity of plane vibrations is small, so that power consumption would increase.

Alternatively, an increase in the low-frequency region gain alone based on a change of the phase compensation filter characteristic could be considered. Since the high-frequency region gain according to this method is substantially equal to that provided by the conventional one, the playability is not deteriorated. However, if the low-frequency region gain of the servo system is increased, the stability of the servo system is impaired accordingly, so that this method is not so recommendable. Thus, the problems of excessive control and power consumption in the regular optical disk reproduction are not solved.

As described above, in the conventional optical disk device, the servo gain is preferably set low for flaws on the optical disk whereas the servo gain is preferably set high for external disturbances such as sounds and/or vibrations. Thus, since there is no method of satisfying those contradictory requirements, the designer must compromise with any one of those requirements.

The present invention intends to solve the above problem. It is an object of the present invention to provide an optical disk reproducing method and apparatus which is capable of reproducing voice information normally with the speaker means built in the optical disk apparatus even when errors exceeding the standards occur and reproducing information from a CD-ROM even in a regular manner (state of use) with low power consumption in a stabilized manner.

SUMMARY OF THE INVENTION

In order to solve the above problem, the present invention provides an optical disk reproducing method comprising the steps of an optical reproducing step of reading information optically from an optical disk; and a servo control step of tracking a track on the optical disk in the optical reproducing step;

the servo control step comprising changing at least one of an amplification factor and frequency characteristic of a servo amplifier used; a voice determining step of determining whether information recorded on the optical disk contains voice information, by rotating the optical disk beforehand; and performing the servo control step on the basis of the result of the determination of the voice determining step, changing the servo control step to one having an amplification factor or frequency characteristic suitable for information to be reproduced, and reproducing the information from the optical disk.

According to this method, the servo control step is changed between when the voice information is reproduced by the speaker means built in the optical disk reproducing apparatus and when the character/image information is outputted to an external host device. As a result, an optical disk reproducing method is obtained which is capable of providing servo control suitable for the situation of reproduction (state of use) of the optical disk apparatus even when the voice output is influenced by vibrations of the built-in speaker means.

The present invention also provides an optical disk reproducing apparatus, comprising: optical disk reproducing means for reading information optically from a track on an optical disk; rotation control means for rotating the optical disk at a predetermined rotational speed; and servo control means for causing the optical reproducing means to track the track on the optical disk; and speaker means for outputting the reproduced voice information;

the servo control means comprising servo characteristic changing means for changing the servo characteristic; target variation detecting means for detecting a variation of a target control value produced when the optical disk is rotated; information determining means for determining whether the information reproduced by optical reproducing means contains voice information; voice converting means for outputting the reproduced information to the speaker means when the information determining means determines that the reproduced information contains voice information; and a controller for controlling the operations of the respective means, wherein the controller causes the rotation control means to rotate the optical disk beforehand, causes the information determining means to determine whether the information reproduced by the information reproducing means contains voice information, and causes the servo characteristic changing means to operate on the basis of a variation for reproducing the voice information and a variation for reproducing no voice information, depending on the result of the determination by the information determining means, to change the servo control means so as to have corresponding appropriate servo characteristics to thereby reproduce the information in the optical disk.

According to this arrangement, the servo characteristic changing means is operated to change the servo control means between when the voice information is reproduced and outputted by the speaker means built in the optical disk reproducing apparatus and when the character/image information is outputted to the external host device.

As a result, an optical disk reproducing apparatus is obtained which is capable of providing servo control on the optical reproducing means based on a quantity of variation of the target control value suitable for the situation of reproduction (state of use) of the optical disk apparatus.

Furthermore, the optical disk reproducing apparatus comprises a bottom case which receives the whole body of the optical disk reproducing apparatus, and a top case having a recess for receiving an optical disk and a pair of speaker openings, a disk cover provided so as to open/close the disk receiving recess, and a pair of speaker means for outputting voice information; and an enclosure for covering the speaker means to leave a space on the back side of the speaker means and for attaching the speaker means closely within the speaker openings.

In this arrangement, air vibrations produced by the speaker means are reduced by the enclosure with a degree sufficient to reduce the influence on the optical reproducing means. Thus, even in an optical disk reproducing apparatus in which portable speakers are built, the user can satisfactorily enjoy a stereophonic voice reproducing effect.

DESCRIPTION OF THE PREFERRED EMBODIMENTS

Figure 1:
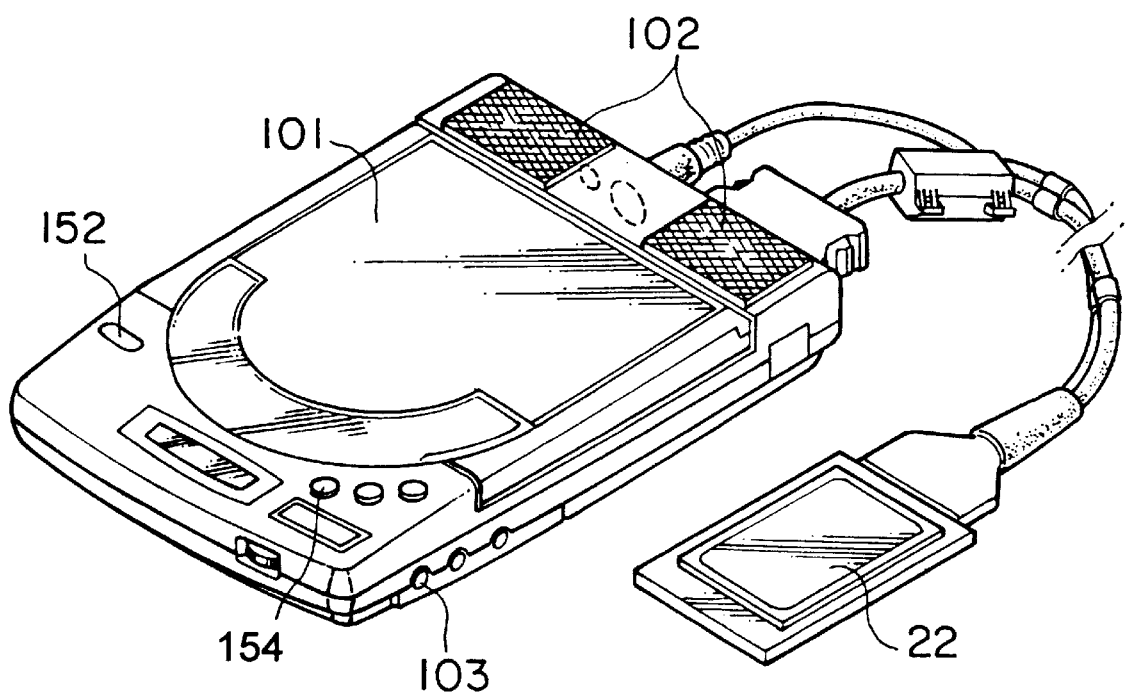
FIG. 1 is a perspective view of a portable CD-ROM player as an embodiment of the present invention.

A CD-ROM player as an optical disk reproducing apparatus in one embodiment of the present invention will be described as an example with reference to the drawings. The same reference numeral is used to denote similar components of the embodiment and the conventional disk reproducing apparatus and further description thereof will be omitted.

(Embodiment 1)

Figure 2:
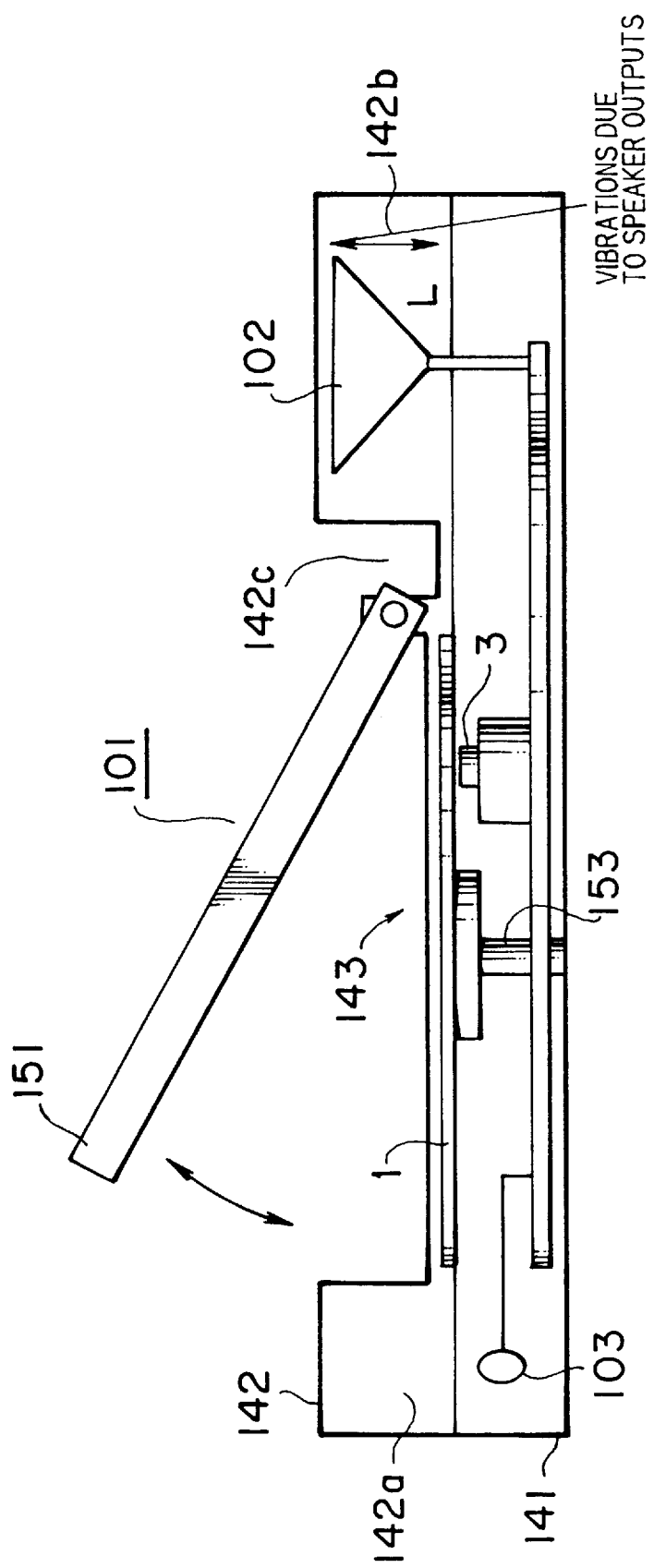
FIG. 2 is a schematic cross-sectional view of the player of FIG. 1.

FIG. 1 is a perspective view of a portable CD-ROM player as one embodiment of the present invention. FIG. 2 is a schematic cross-sectional view taken in FIG. 1.

Reference 101 denotes a CD-ROM player body; 102, speakers built in the player to output voice information; and 103, headphone terminals to output voice information to the outside, for example, a headphone.

Figure 3:
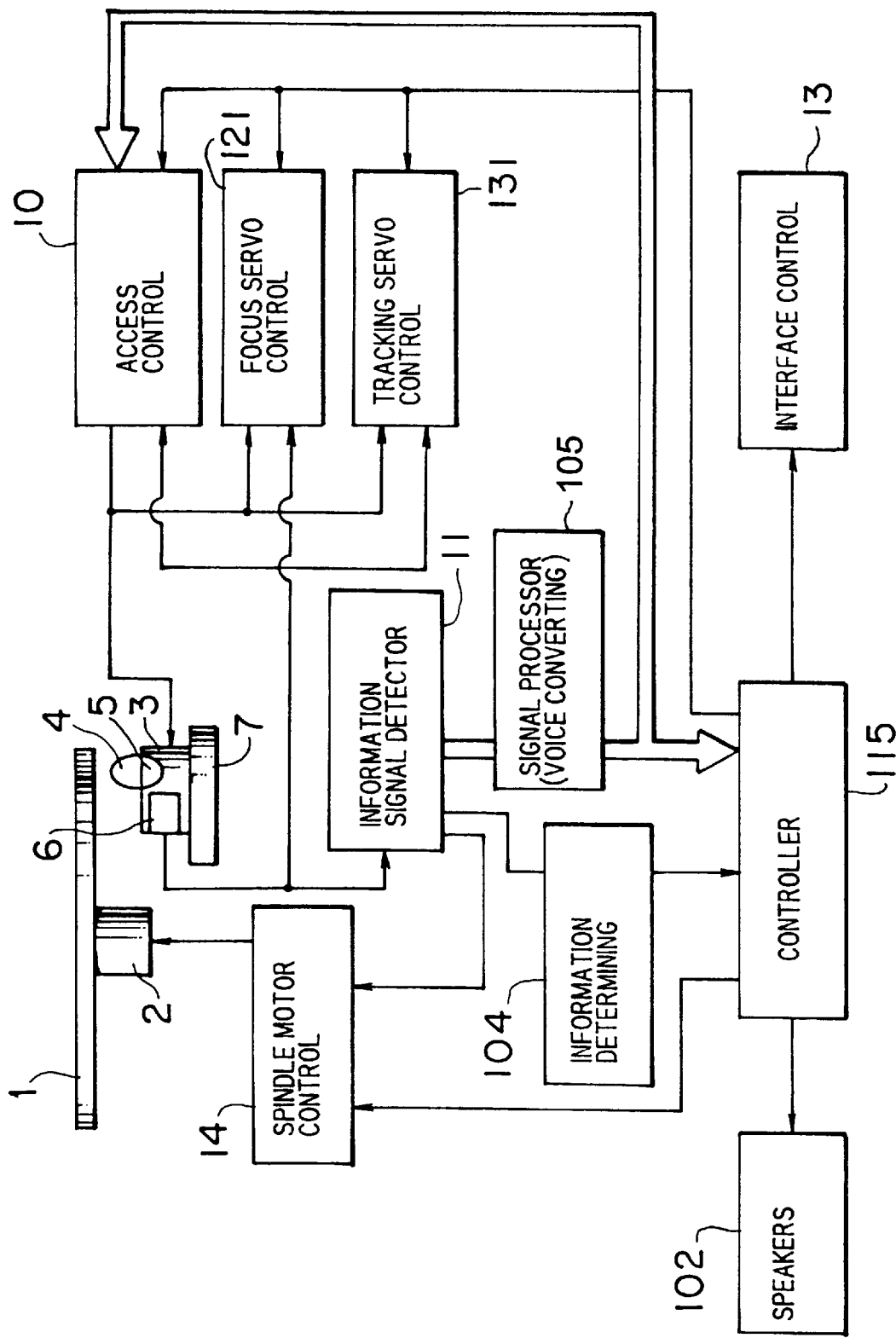
FIG. 3 is a block diagram of the portable CD-ROM player as the embodiment of the present invention.

FIG. 3 is a block diagram of the portable CD-ROM player as the embodiment. Reference numeral 104 denotes information determining means for determining whether information reproduced by the CD-ROM 1 is character/image information or voice information; and 105 voice converting means for converting the reproduced voice information signal to a voice output.

Figure 4:
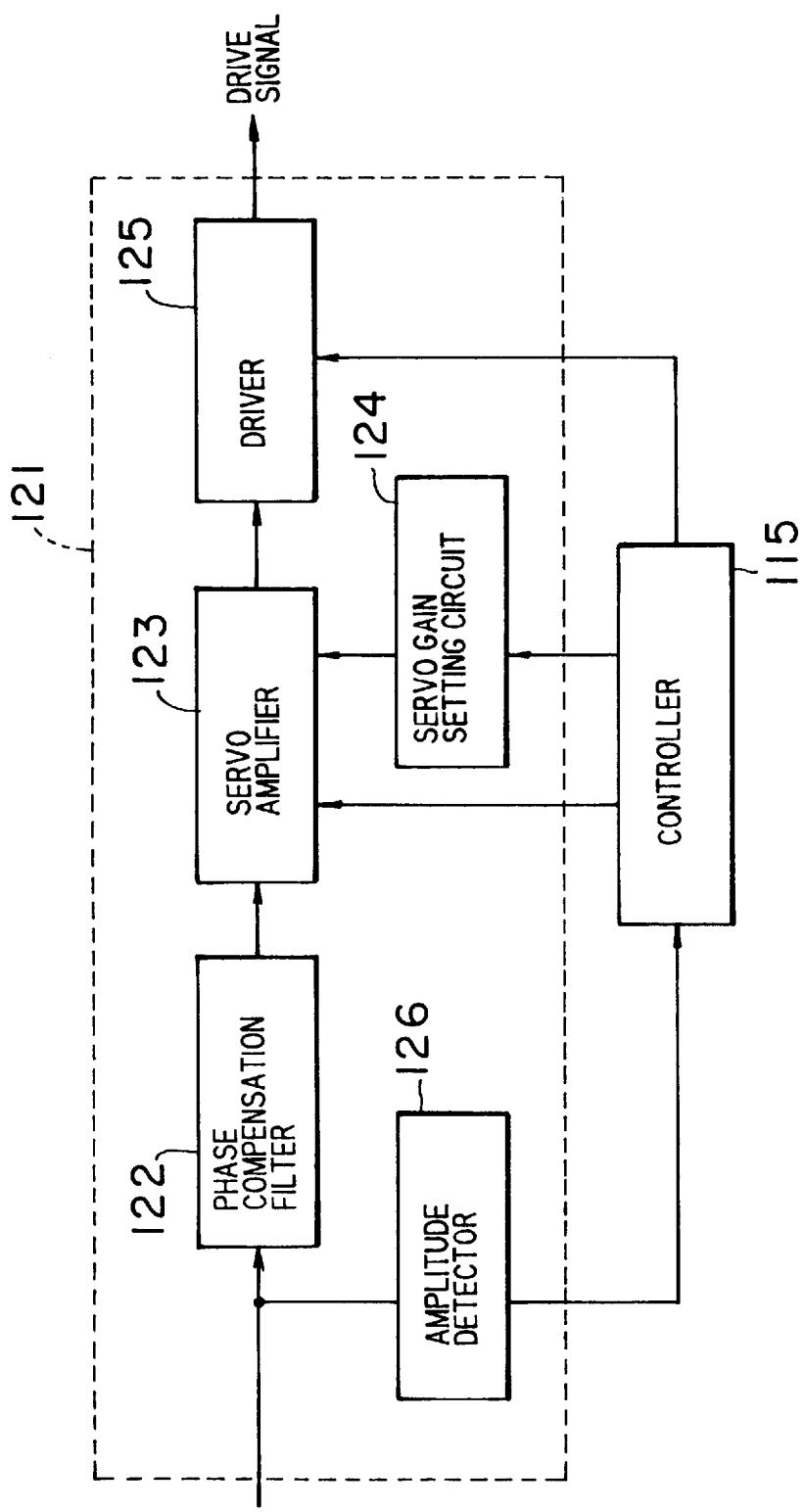
FIG. 4 is a detailed schematic of a focus servo control unit of FIG. 3.

FIG. 4 is a detailed schematic of a focus servo control unit 121 of FIG. 3. In FIG. 4, reference numeral 115, a controller; 122, a phase compensation filter to stabilize the servo system; 123, a servo amplifier; 124, a servo gain setting circuit; 125, a driver; and 126, an amplitude detector.

The operation of the inventive focus servo control unit 121, constructed as described above, will be described next. First, a focus error signal obtained from an optical pickup 3 is inputted to the phase compensation filter 122 which stabilizes the servo system, and passed through the servo amplifier 123 and driver 125 to drive an object lens actuator 5 of the optical pickup 3.

The servo gain setting circuit 124 adjusts the amplification factor of the servo amplifier 123 to set the servo gain at a desired fixed value even when an optical pickup 3 which produces a different optical signal is used and an object lens actuator 5 which has a different sensitivity is used. The controller 115 provides the whole control over the optical disk reproducing apparatus, controls the servo gain setting circuit 124, and turns on/off the driver 125, as will be described later.

First, a power source (not shown) is turned on or otherwise the CD-ROM 1 is replaced with another one. In response to this operation, the optical pickup 3 is turned on and the CD-ROM 1 is started to rotate. In this state, the information determining means 104 detects whether the information reproduced by the CD-ROM 1 contains voice information, and outputs the result of the detection to the controller 115. If the controller 115 detects that the CD-ROM contains the voice information, the controller 115 increases the gain of the servo amplifier 123 by a predetermined quantity.

When the information in the CD-ROM 1 is characters/image (in normal use), the servo gain is set at the conventional one whereas when the voice information is contained, the servo gain is increased (in consideration of vibrations due to the speaker output) and the focus error signal is suppressed to within the predetermined allowable range.

Figure 5:
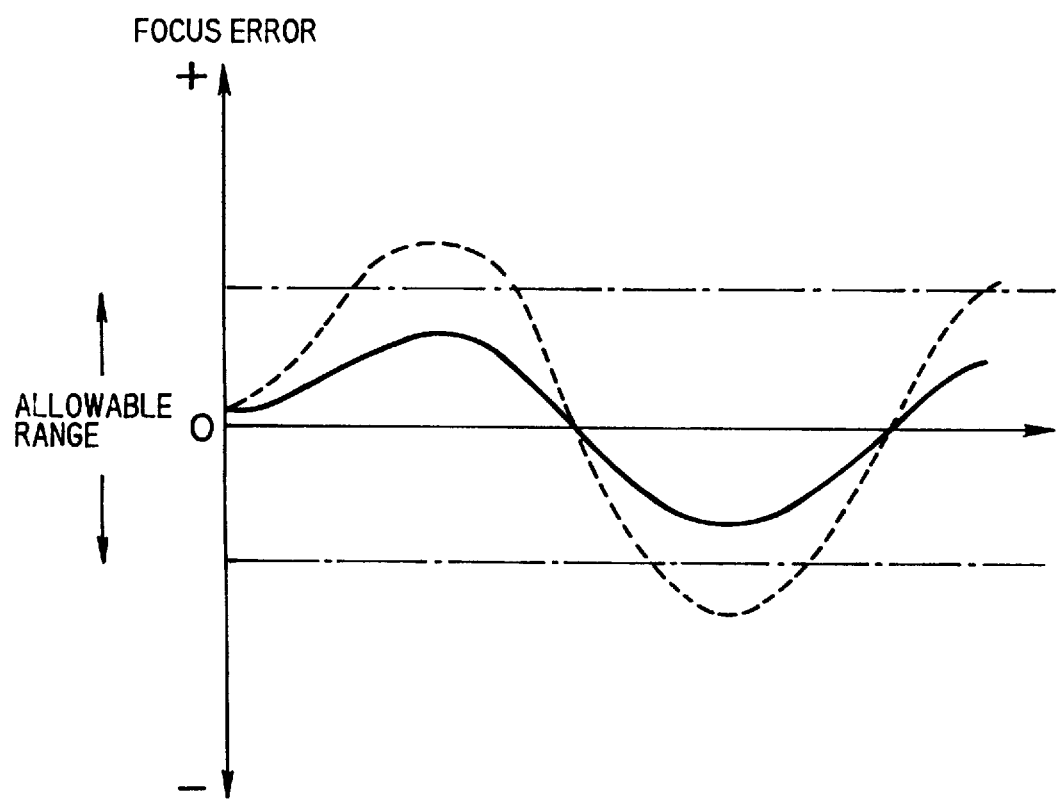
FIG. 5 represents the relationship between focus error signal and allowable range.

FIG. 5 represents the relationship between focus error signal and allowable range. In FIG. 5, a broken line represents a focus error signal read at a set normal servo gain under a situation where the plane vibrations of the CD-ROM 1 are large and the speaker 102 is outputting voice. The amplitude of the focus error signal detected by the amplitude detector 126 exceeds the shown allowable range. Thus, the controller 115 controls the servo gain setting circuit 124 to increase the gain of the servo amplifier 123 by the predetermined value. As a result, the focus servo gain increases and the focus error signal falls into the allowable range, as shown by solid line. Thus, a servo characteristic is provided which provides increased resistance to the vibrations.

In the normal use where no voice output is produced from the speaker 102, the focus error signal falls within the allowable range in the normal servo gain, so that the normal servo gain operation (having a servo characteristic which provides relatively high resistance to flaws on the disk) continues.

(Embodiment 2)

Figure 6:
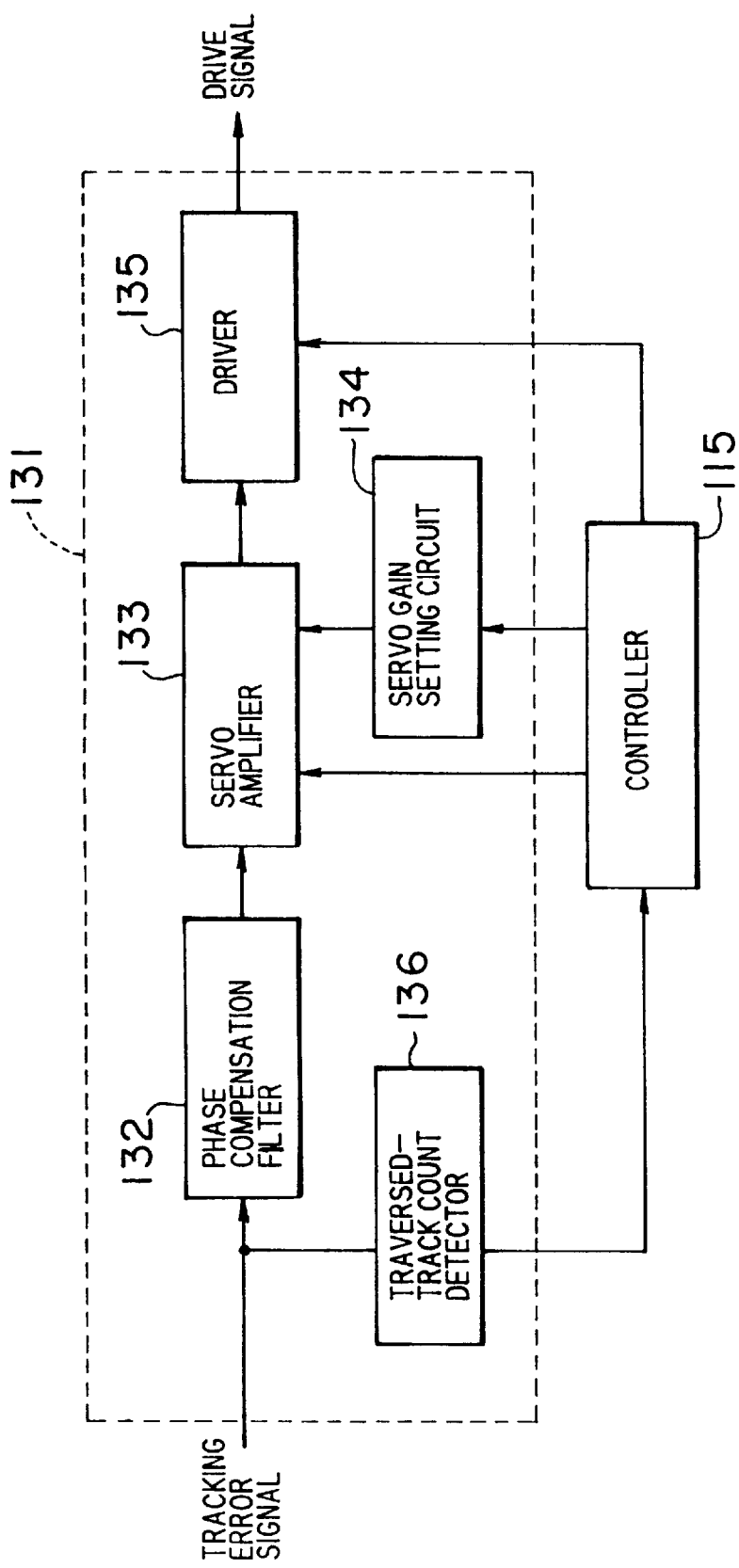
FIG. 6 is a detailed schematic of a tracking servo control unit based on another embodiment of the present invention.

While the focus servo system has been described above, a similar control method applies to the tracking servo system. FIG. 6 is a detailed schematic of the tracking servo control unit 131 based on another embodiment of the present invention. In FIG. 6, reference numeral 115, a controller; 132, a phase compensation filter to stabilize the servo system; 133, a servo amplifier; 134, a servo gain setting circuit; 135, a driver; and 136, a traversed-track count detector.

The operation of the tracking servo control 131, constructed as described above, will be described below. First, a tracking error signal obtained from the optical pickup 3 is inputted to the phase compensation filter 132 for servo system stabilization. The signal outputted from the filter 132 is passed through the servo amplifier 133 and the driver 135 to drive the object lens actuator 5 of the optical pickup 3. The servo gain setting circuit 134 adjusts the amplification factor of the servo amplifier 133 to thereby set the servo gain at a desired fixed value even when an optical pickup 3 which produces a different optical signal is used and an object lens actuator 5 which has a different sensitivity is used.

The controller 115 provides the whole control over the CD-ROM player, controls the servo gain setting circuit 134 and turns on/off the driver 135, as will be described later.

First, a power source (not shown) is turned on or otherwise the CD-ROM 1 is replaced with another one. In response to this operation, the tracking servo is turned off and the CD-ROM 1 is rotated after the focus servo is set. In this state, the information determining means 104 determines whether the reproduced information is voice information. If so (if the built-in speakers produce voice outputs), the controller 115 increases the amplification factor of the servo amplifier 123 by a predetermined value.

More specifically, the servo gain is set at the conventional normal one where if the CD-ROM 1 has no voice information (the built-in speakers produce no sound outputs), but the eccentric quantity of the CD-ROM 1 increases (or may increase) due to the voice output, the controller 115 increases the servo gain to decrease the tracking error signal to within a predetermined allowable track count.

When the gain setting by the tracking servo control unit 131 ends, the tracking servo is turned on to start reading information from the CD-ROM 1.

Figure 7A:
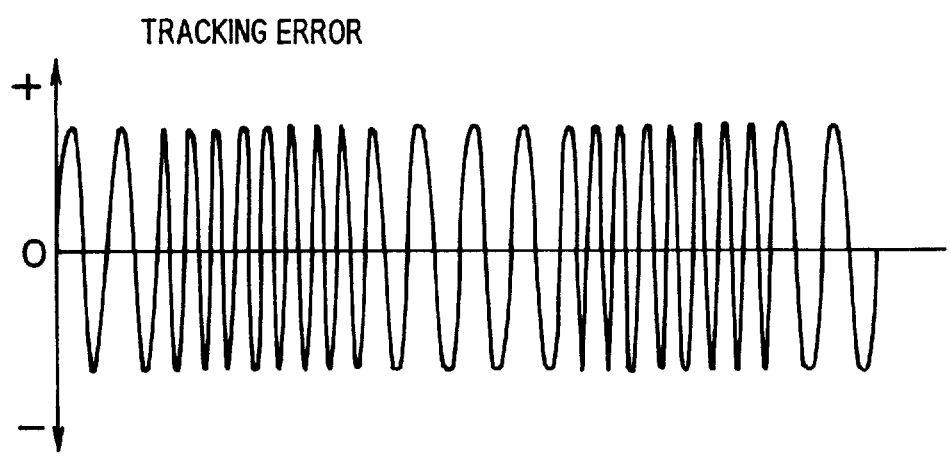
FIGS. 7A and 7B each represent a tracking error signal.
Figure 7B:
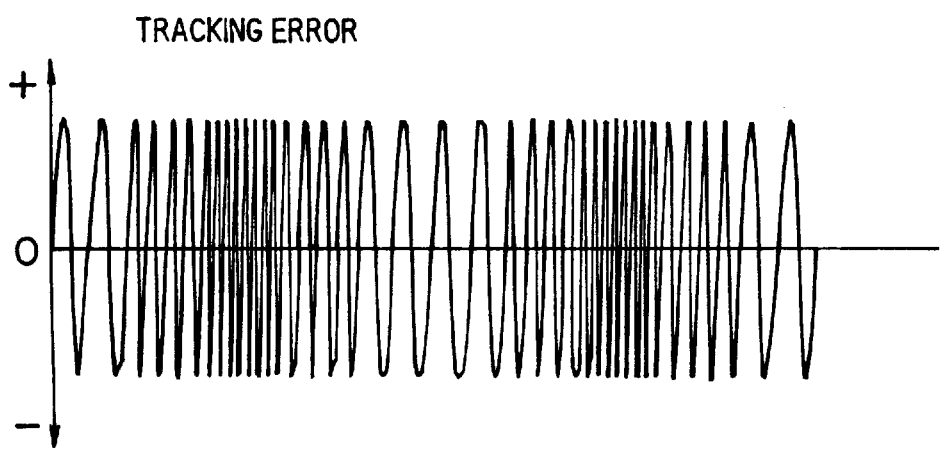

FIGS. 7A and 7B each represent a tracking error signal. FIG. 7A represents a tracking error signal obtained when information in the CD-ROM 1 is reproduced in a normal condition (with no voice output) based on the tracking servo being turned off. FIG. 7B represents a tracking error signal which has reproduced information in the CD-ROM 1 in a condition where the built-in speakers 102 produce voice outputs due to the turning off of the tracking operation. In FIG. 7B, when the eccentric quantity due to vibrations of the speakers 102 by the voice output increases, the count of tracks which the optical pickup 3 traverses during a predetermined time increases.

When the traversed track count detected by the traversed-track count detector 136 is smaller than the predetermined allowable track count (in normal reproduction), the servo amplifier 133 is set at its normal amplification factor by the servo gain setting circuit 134. When the detected track count exceeds the allowable track count (when the speaker 102 produces a voice output, or when the information determining means 104 determines that the reproduced information incudes voice information), the servo amplifier 133 is set at an amplification factor higher by a predetermined quantity by the servo gain setting circuit 134 under control of the controller 115. Thus, the tracking error signal is suppressed to within the allowable track count as in the focus servo control unit 121.

While in the present embodiment a change of the amplification factors of the servo amplifiers 123 and 133 has been illustrated, the respective frequency characteristics of the phase compensation filters 122 and 132 are changed and set at various values by control of the servo gain setting circuits 124 and 134, respectively, in exactly the same manner as the amplification factors of the servo amplifiers 123 and 133. Their applications are obvious from the present embodiments, so that their further descriptions will be omitted.

(Embodiment 3)

Figure 8:
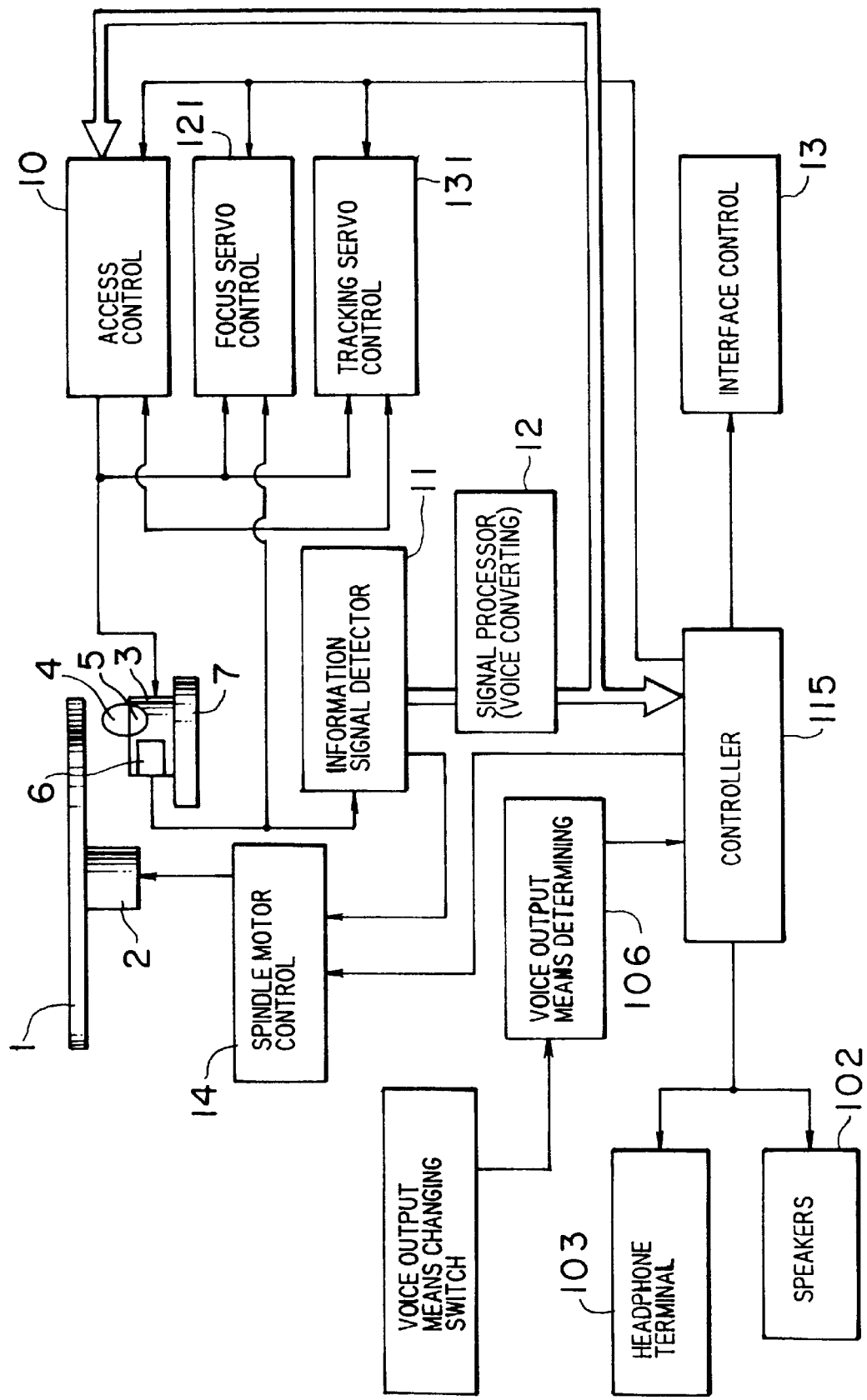
FIG. 8 is a block diagram of a CD-ROM player as a third embodiment of the present invention.

FIG. 8 is a block diagram of a CD-ROM player as a third embodiment of the present invention. Reference numeral 106 denotes a voice output determining means which determines whether the reproduced voice information is outputted through built-in speakers 102 or outputted through headphone terminals 103. Similar components of the embodiments 1, 2 and 3 are identified with the same reference numeral and further description thereof will be omitted.

The difference between the embodiment 1 or 2 and the present invention lies in whether a change of the servo control characteristic is started on the basis of the result of the determination by the information determining means 104 or by the voice output means determining means 106 which determines the voice output means. Thus, a specified method of changing the servo control overlaps with that of the embodiments 1 or 2, and further description thereof will be omitted.

Figure 9:
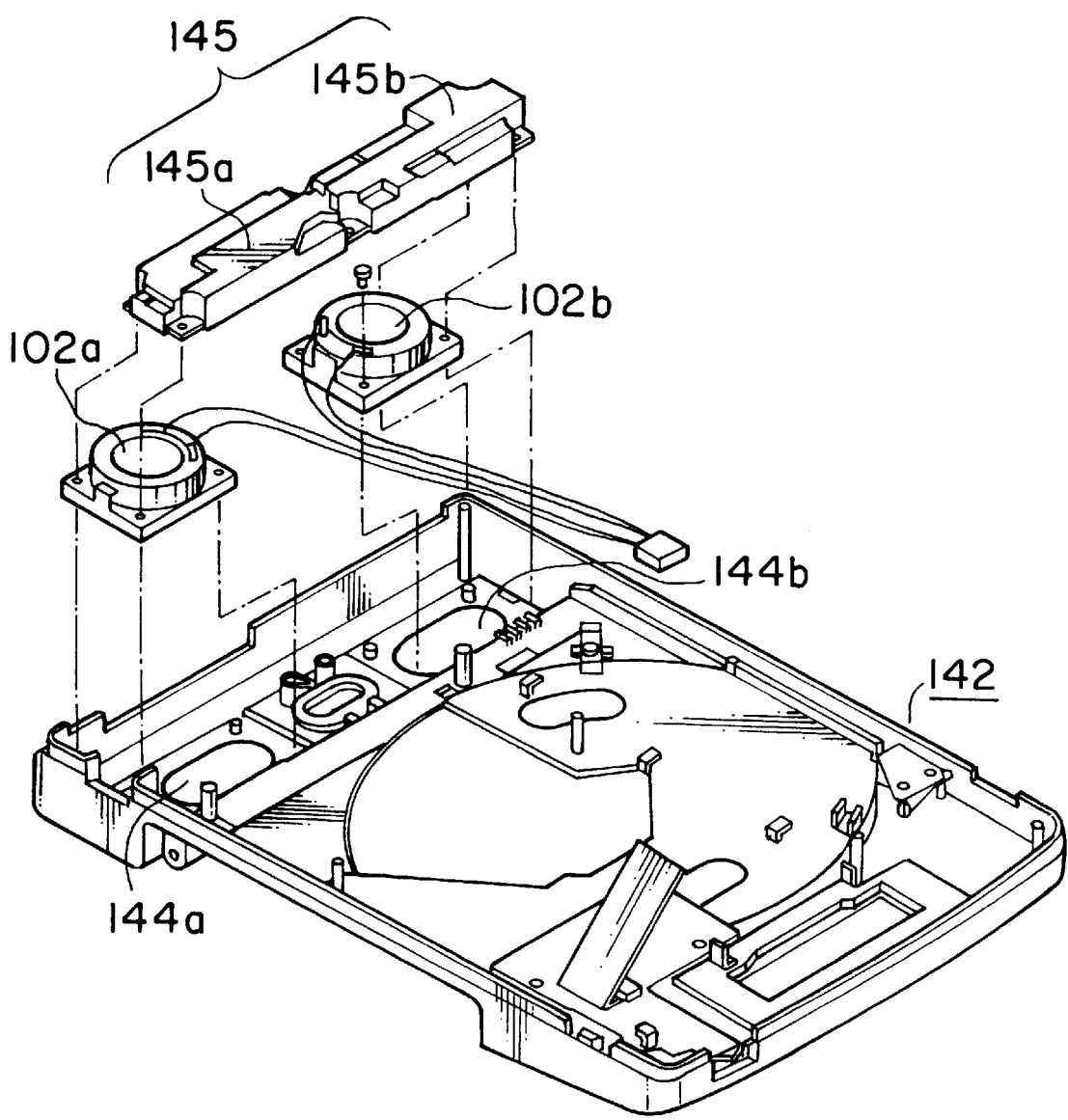
FIG. 9 is a perspective view of the inside of an upper case of FIG. 1.
Figure 10:
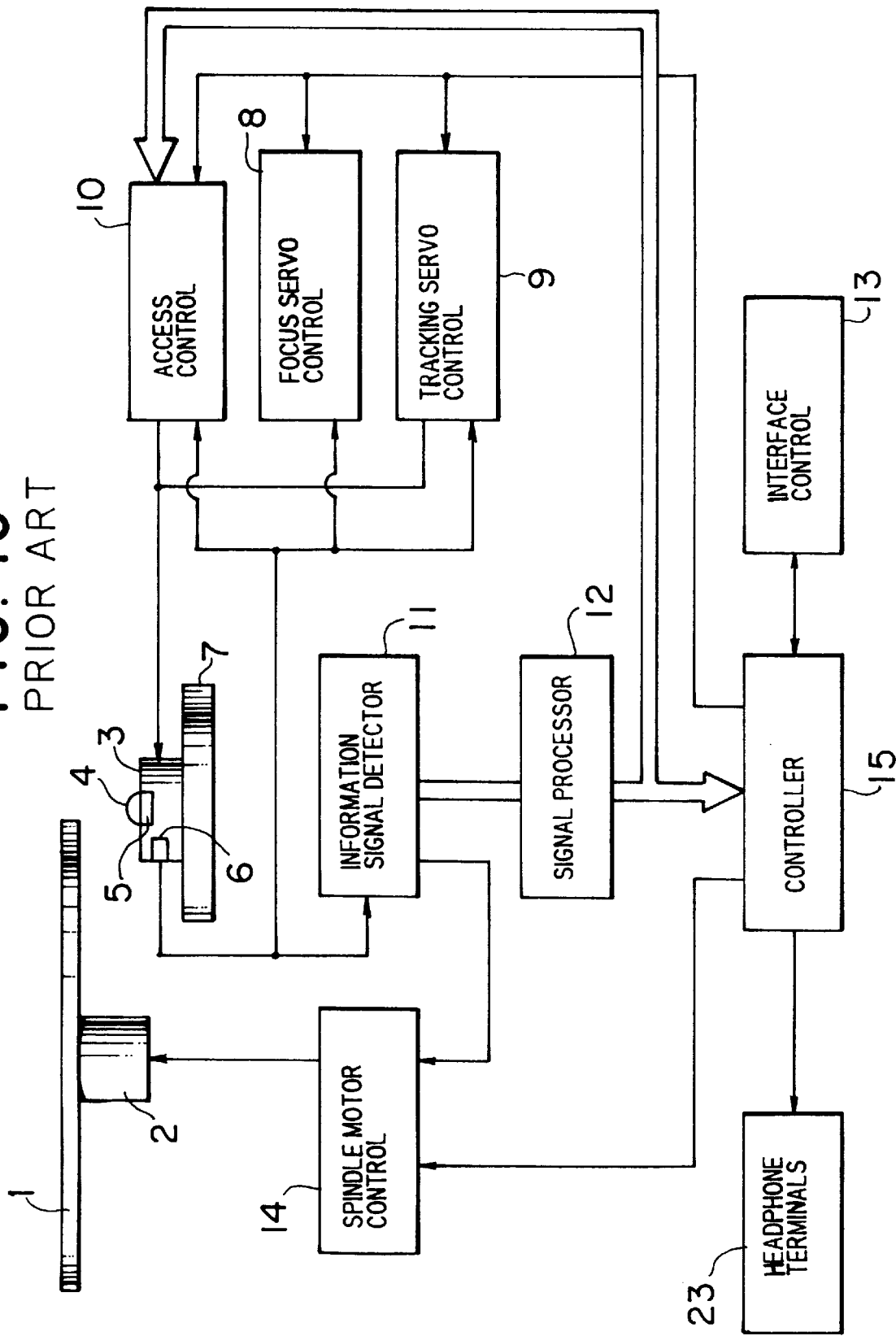
FIG. 10 is a block diagram of a conventional CD-ROM player.
Figure 11:
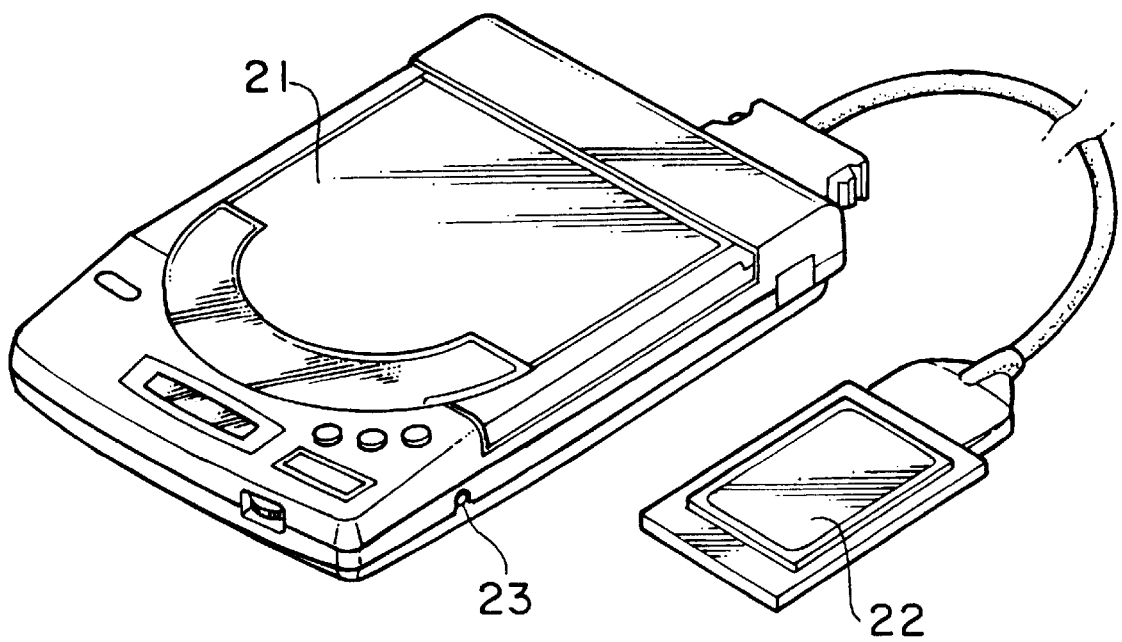
FIG. 11 is a perspective view of the conventional CD-ROM player.
Figure 12:
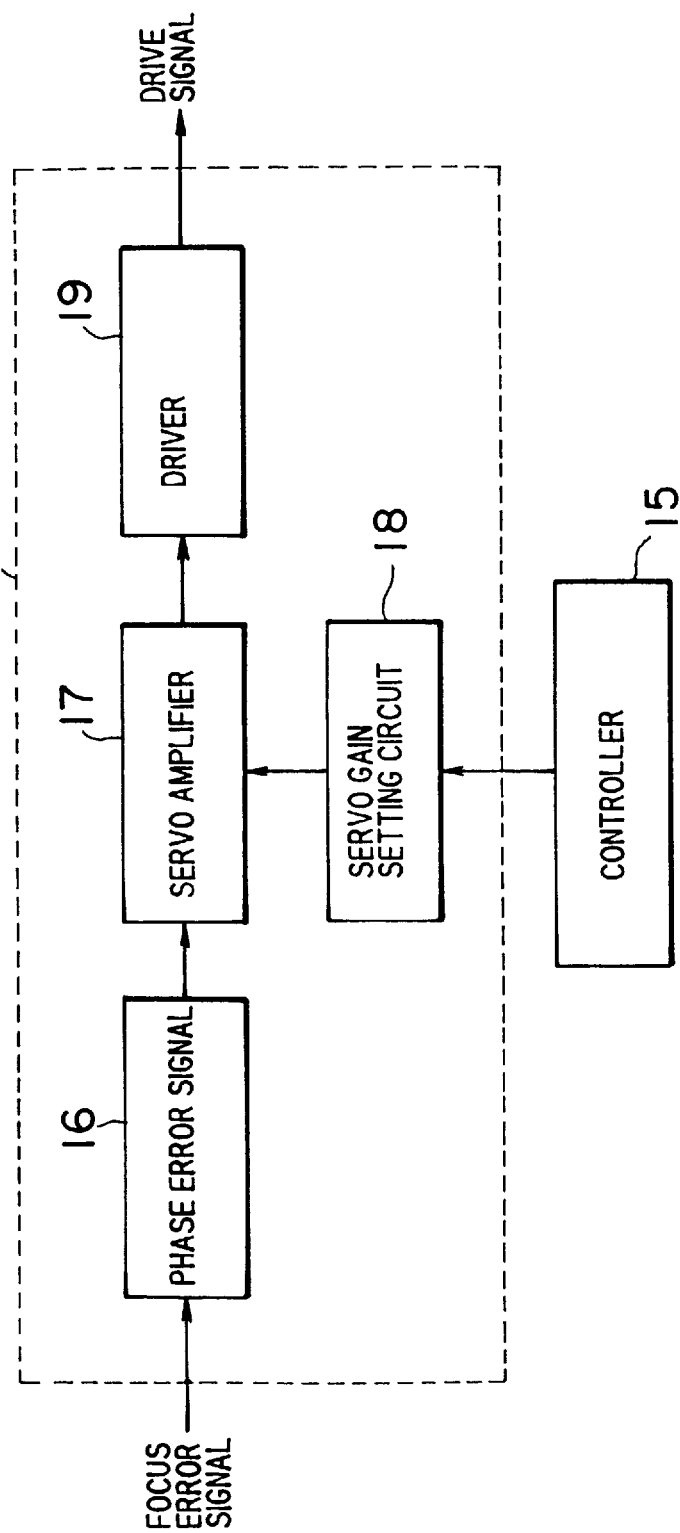
FIG. 12 is a detailed schematic of a conventional focus servo control unit.
Figure 13:
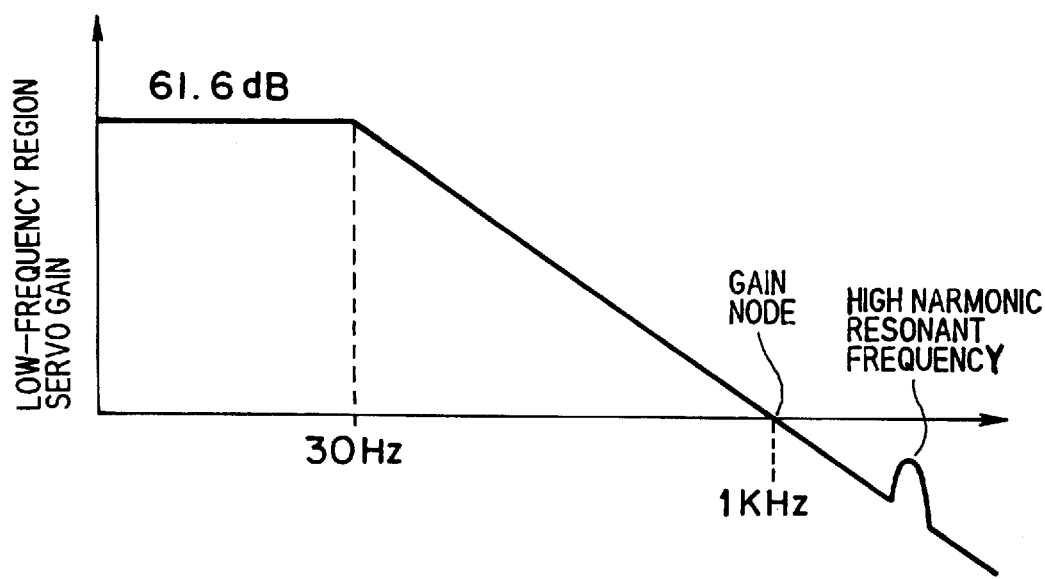
FIG. 13 is an open loop characteristic of a tracking servo.
Figure 14:
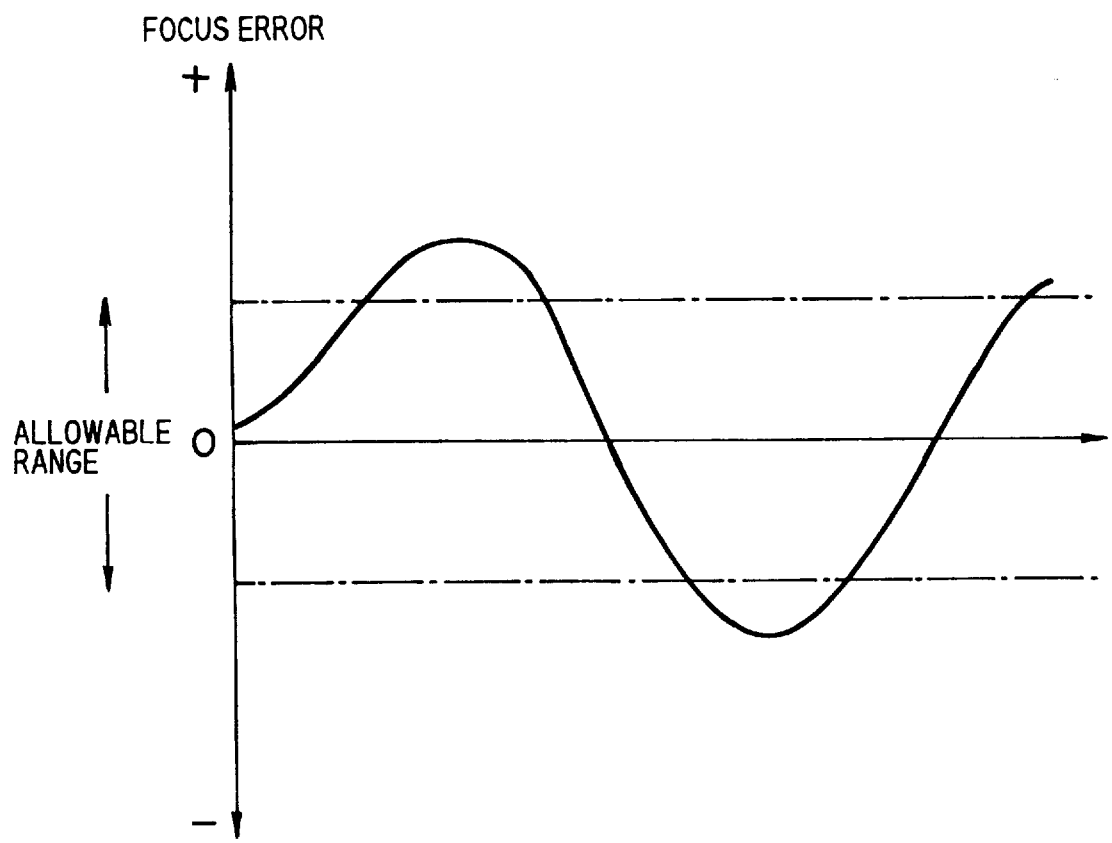
FIG. 14 represents a situation where the focus error has exceeded an allowable range.

(Embodiment 4) The structure of a housing of each of the CD-ROM players 101 described with reference to the embodiments 1–3 will be described as an embodiment 4 of the present invention. FIG. 9 is a perspective view of the inside of an upper case 142 of FIG. 1.

In FIGS. 1, 2, and 9, the CD-ROM player 101 is comprised of a bottom case 141 and a top case 142. The bottom case 141 receives therein the spindle motor 2 and the optical pickup 3. The top case 142 is comprised of a first case portion 142a having a recess 143 for mounting the CD-ROM therein and a second case portion 142b which receives therein the speakers 102. A spacing 142c having a groove-like cross section is formed between the first and second case portions 142a and 142b. Reference numerals 144a and 144b denote right and left speaker openings, respectively, provided on an upper surface of the second case portion 142b.

Reference numerals 102a and 102b denote the two speakers attached to the inner surface of the second case portion 142b. Reference numeral 145 denotes a one-piece enclosure having a pair of recesses 145a and 145b on the back side of the speakers 102 to thereby put the speakers 102 in close contact with the second case portion 142b, and has attached the speakers to positions opposite to the speaker openings 144a and 144b. In this state, the speakers 102 are mounted within the second case portion 142b so that the speakers 102 are positioned above a surface received within the bottom case 141. The recesses 145*a* and 145*b* form a space L on the back side of the speakers (on the opposite side of the speakers 102 from their vibrating plates) sufficient for the operation of the speakers 102.

The operation of the inventive CD-ROM player 101, thus constructed, will be described next. A disk cover 151 is opened by pressing an opening button 152, a CD-ROM 1 is then set onto a turntable 153 in the CD-ROM setting recess 143. The disk cover 151 is then closed to complete the setting of the CD-ROM 1. When a reproduce start button 154 is pressed, the reproduction of the CD-ROM information starts. If the reproduced information is character/image information, such information is processed in the electronic circuit concerned as in the conventional CD-ROM player and then sent to the host computer through the interface card 22.

If the reproduced information is voice information, it is processed in the electric circuit and then converted to a voice signal by the D/A converter. The voice signal is then amplified by the amplifier and outputted as voice to the outside from the speaker openings 144*a* and 144*b* by the speakers 102 built in the second case portion 142*b*.

When the speakers 102 produce corresponding voice outputs, their vibrating plates vibrate back and forth in the air to create air thicker and thinner waves to produce a sound wave. When the vibrating plates move forward, the air present before the vibrating plates is pressed and its density increases whereas the density of the air on the back side of the vibrating plates decreases. This implies that thicker and thinner waves are produced simultaneously before and after the vibrating plates to produce sound waves having opposite phases. The sound wave having the opposite phase produced on the back side of the vibrating plates is confined within the closed space L of the enclosure 145.

The air within the confined space L acts as a spring on the vibrating plates of the speakers 102. Thus, this exerts an especially preferable action on the voice output in a very low frequency sound region. That is, an adverse influence due to interference with a sound wave having the opposite phase produced on the back side of the vibrating plates is suppressed.

The enclosure 145 has a strength enough to withstand the air spring and is composed of the right and left enclosure portions as a unit, and the speakers 102 are attached within the second case portion 142*b* so that the speakers are positioned above a surface received in the bottom case portion 141. Thus, the air compression waves are sufficiently attenuated by the second case portion 142*b*.

As described above, although the speakers 102 and the pickup 3 are close to each other, the influence of the speakers is attenuated satisfactorily.

As described above, according to the present invention, the influence of the voice output is suppressed by the servo control and attenuated sufficiently by the structure of the housing. Thus, the performance on the power consumption and stability in the ordinary disk information reproduction are maintained. In addition, even in the reproduction of the voice outputs by the built-in speakers 102, the focus error signal and tracking error signal are suppressed to within the allowable ranges, so that an optical disk reproducing apparatus is provided which is capable of reproducing stabilized optical disk information.

What is claimed is:

1. A reproducing apparatus for reproducing information from a track on a medium, the apparatus comprising:

reproducing means for reading the information from the medium;

servo control means for causing said reproducing means to track the track on the medium;

speaker means for outputting voice information in accordance with the information;

voice output determining means for determining whether the information read by said reproducing means comprises the voice information which should be outputted to said speaker means;

servo characteristic changing means for changing, responsive to a result of determination made by the voice output determining means, a servo characteristic of the servo control means by (i) increasing an amplification factor of a servo amplifier of the servo control means or (ii) changing a frequency characteristic of a phase compensation filter of the servo control means when the voice information is output to the speaker means; and a controller for controlling operations of said reproducing means, said servo control means, said speaker means, said voice output determining means and said servo characteristic changing means;

wherein said controller comprises means for controlling said reproducing means to read the information, said voice output determining means to determine whether the information comprises the voice information which should be outputted to said speaker means, said servo characteristic changing means to operate in accordance with the result of the determination by said voice output determining means, and said servo control means so that the servo characteristic has (i) a high resistance to vibration when the result of the determination indicates that the information comprises the voice information which should be output to the speaker means and (ii) high resistance to flaws in the medium when the result of the determination indicates that the information does not comprise the voice information which should be output to the speaker means. such that the servo control means has the servo characteristic which is suitable for an output state of the information.

2. A reproducing apparatus according to claim 1, wherein:

the medium is an optical disk; and the apparatus further comprises rotation control means for rotating the optical disk at a predetermined rotational speed.

3. A reproducing apparatus according to claim 1, wherein the speaker means comprises a plurality of loudspeakers.

4. A reproducing apparatus according to claim 1, further comprising a common housing in which the reproducing means, the servo control means and the speaker means are provided.

5. A disk reproducing apparatus for reproducing information from a track on a medium, the apparatus comprising:

reproducing means for reading the information from the medium;

servo control means for causing said reproducing means to track the track on the medium;

speaker means for outputting voice information in accordance with the information;

voice external outputting means for outputting the voice information to to an external device;

voice output selecting means for selecting one of said speaker means and said voice outputting means for outputting the voice information;

servo characteristic changing means for changing, responsive to a selection made by the voice output selecting means, a servo characteristic of said servo control means by (i) increasing an amplification factor of a servo amplifier of the servo control means or (ii) changing a frequency characteristic of a phase compensation filter of the servo control means when the voice information is output to the speaker means; and a controller for controlling the operations of said reproducing means, said servo control means, said speaker means, said voice external output means, said voice output selection means and said servo characteristic changing means;

wherein said controller comprises means for controlling said servo characteristic changing means so that the servo characteristic has (i) a high resistance to vibrations generated by the speaker means when the voice information is output to the speaker means and (ii) a high resistance to flaws in the medium when the voice information is not present in the information or is not output to the speaker means, such that the servo control means has the servo characteristic which is suitable for an output state of the voice information.

6. A reproducing apparatus according to claim 5, wherein:

the medium is an optical disk; and the apparatus further comprises rotation control means for rotating the optical disk at a predetermined rotational speed.

7. A reproducing apparatus according to claim 5, wherein the speaker means comprises a plurality of loudspeakers.

8. A reproducing apparatus according to claim 5, further comprising a common housing in which the reproducing means, the servo control means and the speaker means are provided.

9. A reproducing method for reproducing information from a track on a medium, the method comprising:

(a) providing (i) reproducing means for reading the information from the track on the medium, (ii) servo control means for causing said reproducing means to track the track on the medium, and (iii) speaker means for outputting voice information in accordance with the information;

(b) reading the information from the medium with the reproducing means;

(c) actuating the servo control means in step (b);

(d) outputting the voice information to the speaker means; and (e) changing a servo characteristic of the servo control means by (i) increasing an amplification factor of a servo amplifier of the servo control means or (ii) changing a frequency characteristic of a phase compensation filter of the servo control means when step (d) is performed;

wherein step (e) is performed to change the servo characteristic of the servo control means to a characteristic suitable for outputting the voice information from the speaker means to reproduce the information from the medium.

10. A reproducing method according to claim 9, wherein:

the medium is an optical disk;

step (a) further comprises providing rotation control means for rotating the optical disk at a predetermined rotational speed; and step (b) is performed while the rotation control means rotates the optical disk.

11. A reproducing method according to claim 9, wherein the speaker means comprises a plurality of loudspeakers.

12. A reproducing method according to claim 9, wherein step (a) further comprises providing the reproducing means, the servo control means and the speaker means in a common housing.

* * * * *